United States Patent [19]
Fischer

[11] Patent Number: 5,899,487
[45] Date of Patent: May 4, 1999

[54] APPARATUS FOR ATTACHING A GAS BAG COVER ON A PART OF A VEHICLE

[75] Inventor: Anton Fischer, Heuchlingen, Germany

[73] Assignee: TRW Occupant Restraint Systems GmbH, Alfdorf, Germany

[21] Appl. No.: 08/931,734

[22] Filed: Sep. 16, 1997

[30] Foreign Application Priority Data

Sep. 27, 1996 [DE] Germany .......................... 296 16 914

[51] Int. Cl.⁶ .................................................. B60R 21/16
[52] U.S. Cl. .................................... 280/728.3; 280/728.2; 280/731
[58] Field of Search ........................... 280/728.1, 728.2, 280/728.3, 731

[56] References Cited

U.S. PATENT DOCUMENTS

| | | |
|---|---|---|
| 5,297,813 | 3/1994 | Baba et al. ........................... 280/728.2 |
| 5,439,246 | 8/1995 | Ravenberg et al. . |
| 5,584,501 | 12/1996 | Walters ................................ 280/728.2 |
| 5,669,626 | 9/1997 | Bartos et al. ......................... 280/728.2 |

*Primary Examiner*—Eric D. Culbreth
*Attorney, Agent, or Firm*—Tarolli, Sundheim, Covell, Tummino & Szabo

[57] ABSTRACT

An apparatus for attaching a gas bag cover on a part of a vehicle is provided, which comprises an attachment rib on the gas bag cover and an interlocking snap connection adapted to act on the attachment rib. The interlocking snap connection includes a locking element which is movably mounted on the vehicle part and is acted on by a spring element adapted to displace the locking element from an initial position into a locking position. The interlocking snap connection further comprises a detent mechanism which prevents the spring element from displacing the locking element when the latter is in its initial position. The detent mechanism is adapted to release the locking element during mounting the gas bag cover at the vehicle part.

6 Claims, 3 Drawing Sheets

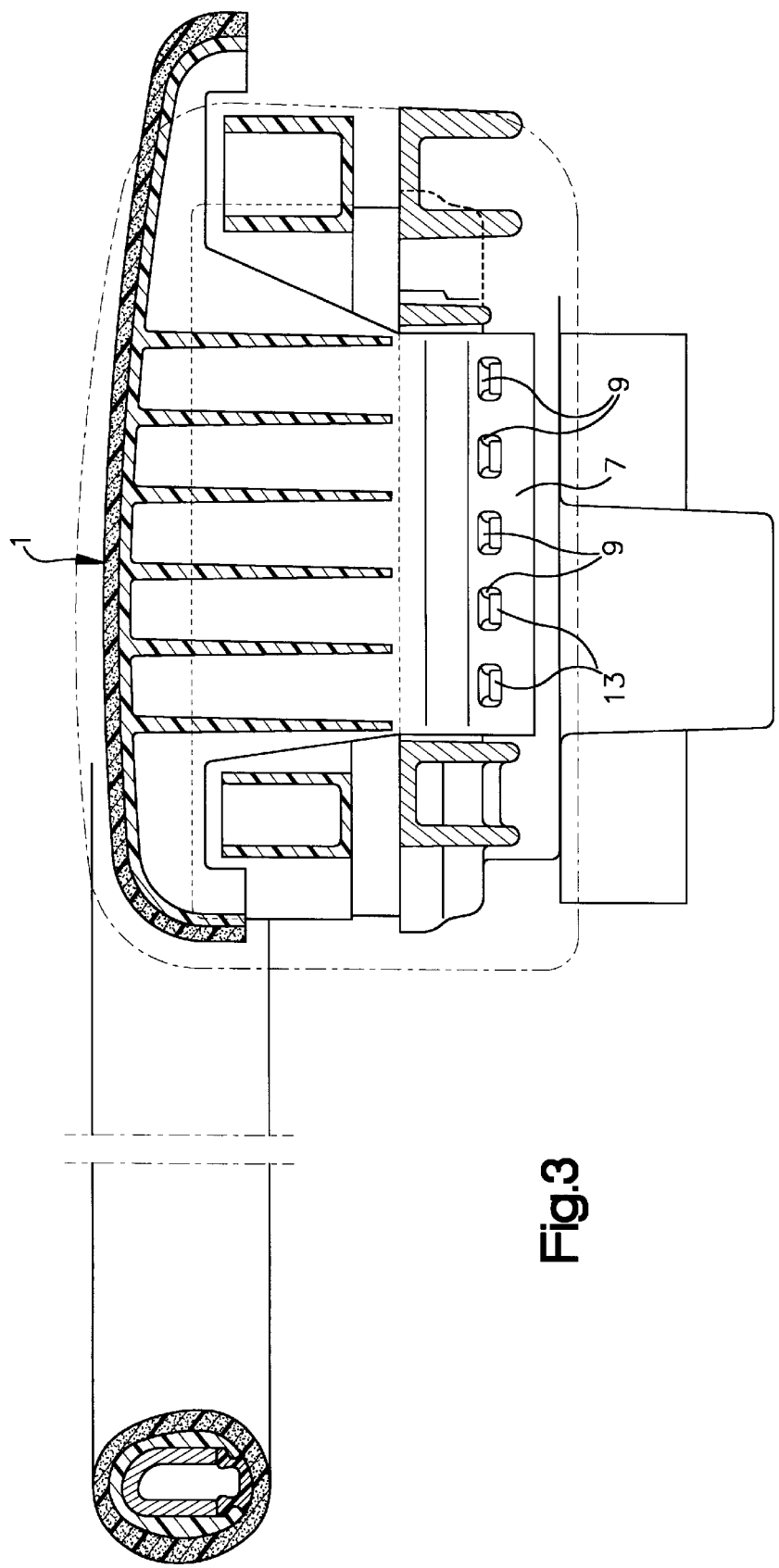

APPARATUS FOR ATTACHING A GAS BAG COVER ON A PART OF A VEHICLE

BACKGROUND OF THE INVENTION

The invention relates to an apparatus for attaching a gas bag cover on a part of a vehicle.

Conventional gas bag covers are attached to a vehicle part by means of an attachment device, the device being designed in the form of an interlocking snap connection adapted to act on an attachment rib formed on the gas bag cover.

A gas bag cover is for example secured to the steering wheel hub or, for covering a front passenger gas bag, to the dashboard. The European patent publication 0 669 230 A1 discloses a device of this kind for the attachment of a gas bag cover, which is in the form of a snap connection. For this purpose, hook-like attachment ribs are provided, which are formed on the inside of the gas bag cover, said ribs in the fitted condition reaching behind a vehicle part. For fitting, the gas bag cover is merely placed over the gas bag and pressed into position. The attachment ribs must be so designed that during deployment of the gas bag, the cover does not become loose or, still worse, is pulled out of its anchoring means.

BRIEF DESCRIPTION OF THE INVENTION

The invention is to provide a device which entails more safety as regards preventing release from, or damage to, the anchoring means of a gas bag cover than in the prior art. According to the invention, an apparatus for attaching a gas bag cover on a part of a vehicle is provided, which comprises an attachment rib on the gas bag cover and an interlocking snap connection adapted to act on the attachment rib. The interlocking snap connection comprises a spring element and a locking element which latter is movably mounted on the vehicle part and is acted on by the spring element adapted to displace the locking element from an initial position into a locking position. The interlocking snap connection further comprises a detent mechanism which prevents the spring element from displacing the locking element when the latter is in its initial position. The detent mechanism is adapted to release the locking element during mounting the gas bag cover to the vehicle part.

In the device according to the invention, the attachment rib, during pressing the gas bag cover into its place, is not bent laterally in order to snap back into place and to reach behind a vehicle part after sliding along the latter. A spring element provided in accordance with the invention for driving the locking element ensures that the locking element can be displaced a considerable distance and consequently engages the attachment rib over a larger area and more reliably than in the prior art device. Accordingly, it is also possible to reduce the surface pressure acting upon the wall in the area of the recess during deployment of the gas bag.

Preferably, the locking element is in the form of a slide body mounted for sliding motion in translation, said body engaging a recess in the attachment rib.

In accordance with the preferred embodiment, the detent mechanism comprises a lever, which holds the locking element in the initial position, the lever preferably being in the form of a strip spring fixed at one end. During fitting of the cover, the attachment rib displaces the lever so that the locking element may be moved.

BRIEF DESCRIPTION OF THE DRAWINGS

Further features and advantages of the invention will appear from the following description and the drawings, to which reference is made and in which:

FIG. 3 is a sectional view taken along the line III—III of FIG. 1.

DETAILED DESCRIPTION OF THE INVENTION

Figure 1:
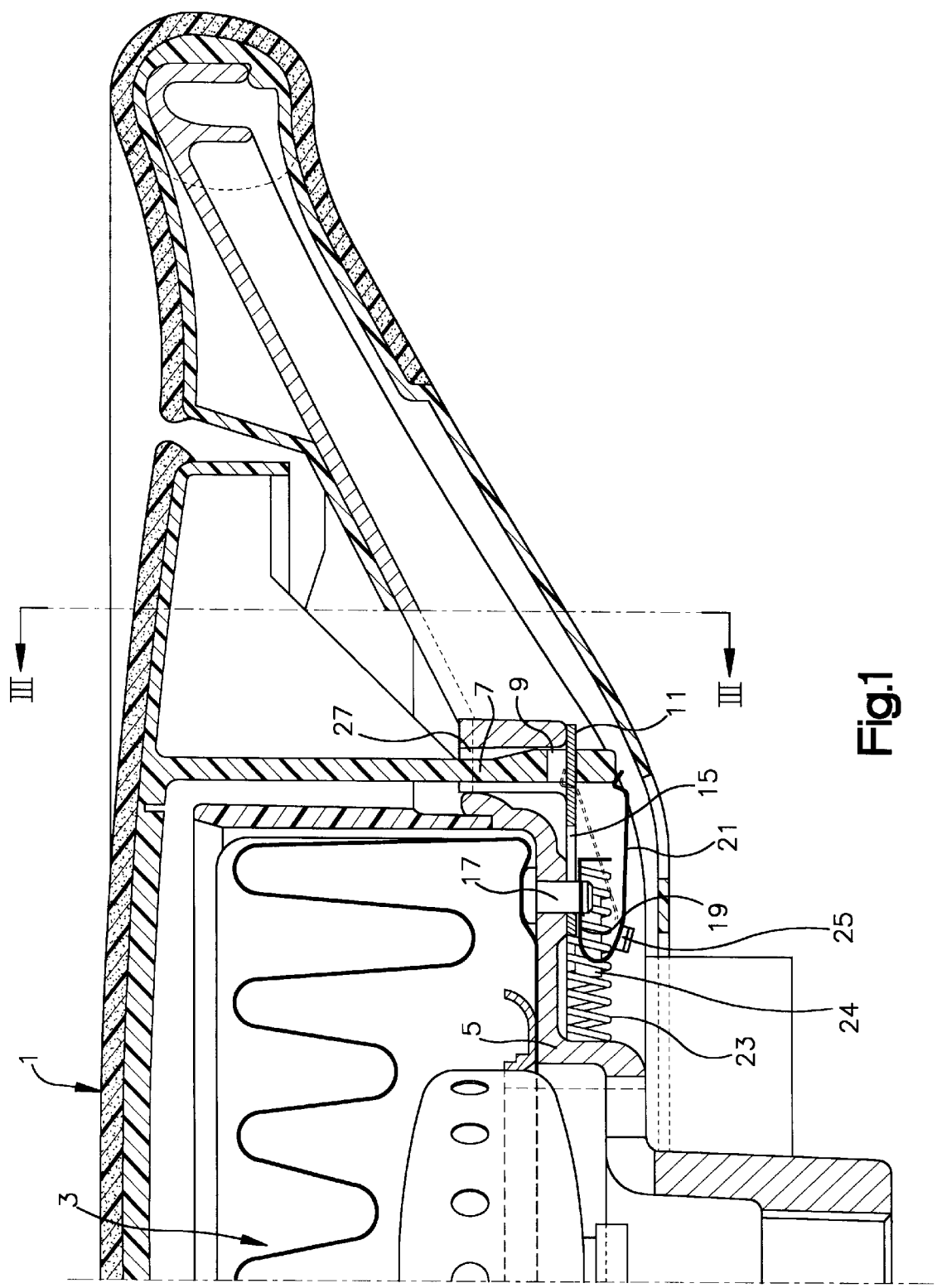
FIG. 1 shows half a section taken through a gas bag cover which is attached on a steering wheel hub by the device according to the invention.

In FIG. 1, a gas bag cover 1 is illustrated, which covers a gas bag module 3 attached to a steering wheel hub 5. On the inner side of the cover 1, on opposite sides of the gas bag module 3, two projecting plate-like attachment ribs 7 are formed. In the area of its lower end, the right hand attachment rib 7 as shown in FIG. 1 possesses spaced apart slot-like recesses 9 (see also FIG. 3).

Figure 2:
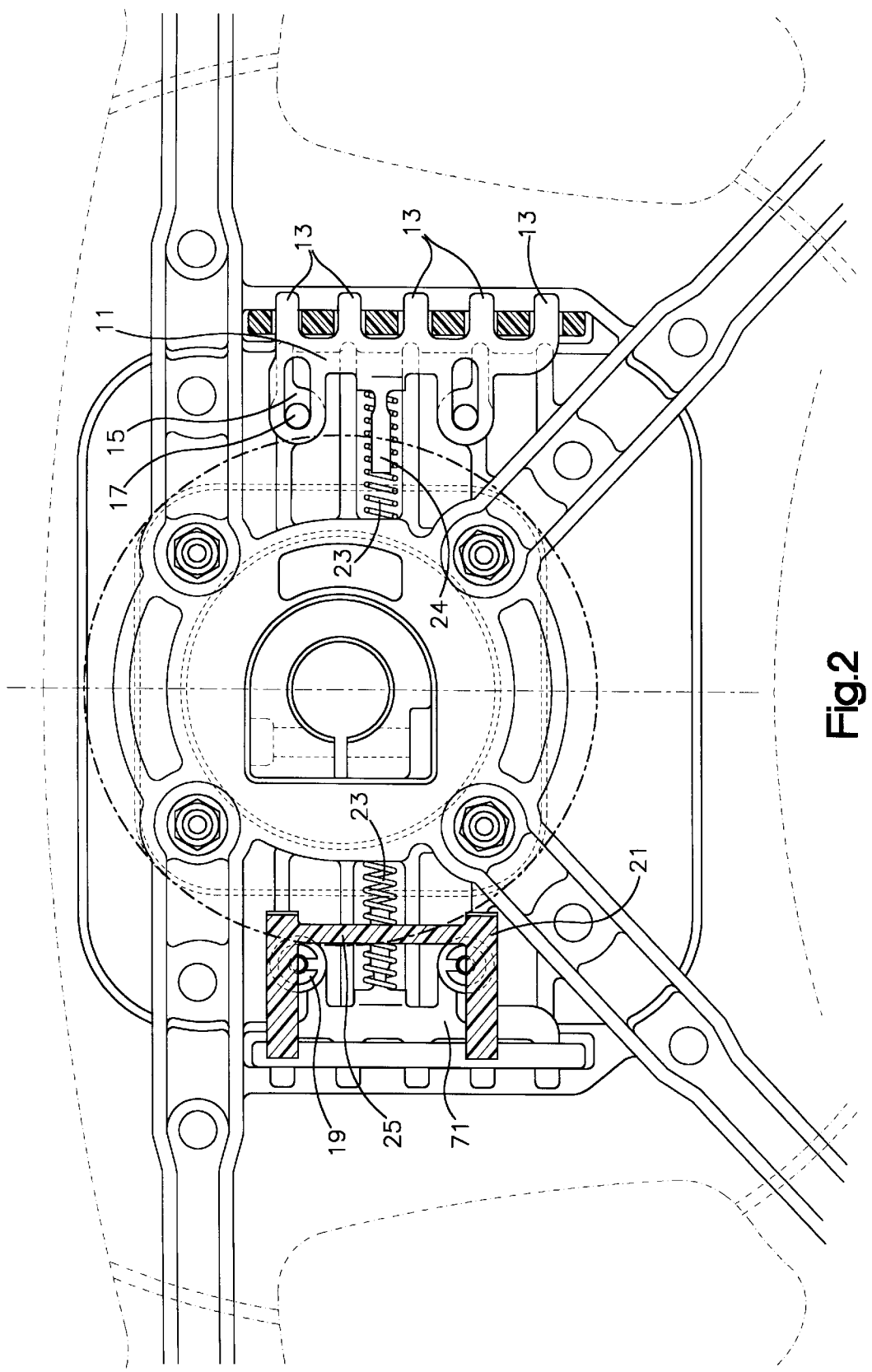
FIG. 2 is a sectional view of the gas bag cover as in FIG. 1 as seen from below, in which the parts of the device are emphasized, the views on the left hand and on the right hand side of the drawing illustrating horizontal sections in different planes.

The cover 1 is held firmly in place on the steering wheel hub 5 by a snap connection. Apart from the recesses 9, the snap connection has a comb-like locking element 11 formed as a slide body, whose prongs 13 respectively fit into an associated recess 9, as will be seen from FIG. 2. The locking element 11 is mounted on the steering wheel hub 5 so that it may be slid in translation. For this purpose, it has two parallel elongated holes 15 through each of which the shank of an associated bolt 17 extends, said bolt having a locking ring 19 at its bottom end. The locking element 11 guided in this manner extends in the intermediate space between the bottom side of the wall of the steering wheel hub 5, in which the bolts are inserted, and the top side of the locking rings 19.

The bolts 17 additionally serve to hold a detent mechanism in the form of a lever 21. This mechanism comprises a plate spring, which is manufactured from an H-shaped stamped piece of spring sheet metal. Two parallel ends of the lever 21 each are clamped between a locking ring 19 and the locking element 11 with the result that the lever 21 is held at one end. Where it is not held, the lever 21 is bent into a U-shape and extends toward the attachment rib 7, at which the two free ends of the lever abut the bottom side of the rib. The detent mechanism serves to hold the locking element 11 in the initial position, in which the cover 1 is not yet fitted. In this initial position, the locking element 11 is displaced toward the center of the steering wheel in comparison with the locking position as illustrated in the figures and is held in this initial position by the intermediate rib 25 which is explained here-in-below.

A compression spring 23 is seated on a tongue 24 (see FIG. 2) which is formed on the locking element 11 and extends toward the center of the steering wheel and, in the initial position in which it is compressed, said spring bears on the one hand on the steering wheel hub 5 and on the other hand on an intermediate rib 25 on the H-shaped lever 21. In FIG. 1, the initial position of the lever 21 is represented in dot-dash lines. The compression spring 23 is prevented from displacing the locking element 11 by means of the lever 21 constituting the detent mechanism. More precisely, the spring 23 is hindered by the intermediate rib 25 from expansion since the end of the spring 23 seated on the tongue 24 abuts against the intermediate rib 25 in the initial position.

For fitting the cover 1, same is simply pressed onto the steering wheel hub 5. In doing so, the attachment ribs 7 are inserted through a slot-like guide 27 in the steering wheel hub 5. Into the bottom end of the guide 27, there extend two free ends of the lever 21, as will be seen from the position, indicated in dot-dash lines, of the lever 21 in FIG. 1. By insertion of the attachment rib 7, the lever 21 is thrust downward until finally the intermediate rib 25 releases the compression spring 23. The spring then abruptly displaces the locking element 11 outwardly into the locking position in which the prongs 13 extend through the recesses 9. On the outer side, the prongs 13 have their free ends bearing against a portion of the steering wheel hub 5. The attachment rib 11 is thus locked and the device is not even released when subject to vibration.

The device for the attachment of the gas bag cover 1 may be released again by sliding the locking element 13 into the initial position and removing the cover 1 so that the lever 21 may spring back in order to hold the compression spring 23.

Owing to the interlocking catch and the large engagement areas between the locking element 11 and the attachment rib 7, on tearing open the cover during deployment of the gas bag, no excessively high surface pressures are developed which might otherwise result in the structure giving way at the recesses 9.

I claim:

1. An apparatus for attaching a gas bag cover on a part of a vehicle, comprising an attachment rib on said gas bag cover and an interlocking connection adapted to act on said attachment rib, said interlocking connection comprising a spring element and a locking element which latter is movably mounted on said vehicle part and is acted on by said spring element so as to displace said locking element from an initial position into a locking position, and a detent mechanism which prevents said spring element from displacing said locking element when the latter is in said initial position, said detent mechanism being adapted to release said locking element during mounting of said gas bag cover to said vehicle part.

2. The apparatus of claim 1, wherein said locking element is formed as a slide body adapted to be displaced in translation, said slide body engaging at least one recess in said attachment rib.

3. The apparatus of claim 2, wherein said attachment rib has a plurality of recesses and said slide body has a plurality of prongs extending into an associated one of said recesses in said attachment rib.

4. The apparatus of claim 1, wherein said detent mechanism comprises a lever for holding said locking element in said initial position, said lever, during fitting of said gas bag cover, being displaced by said attachment rib, thereby permitting displacement of said locking element.

5. The apparatus of claim 4, wherein said lever is designed in the form of a plate spring fixed at one of its ends.

6. The apparatus of as claimed in claim 5, wherein said lever is an H-shaped piece stamped from spring sheet metal and having an intermediate rib which engages said spring element in said initial position.

* * * * *